United States Patent [19]

Berglund et al.

[11] 4,256,314
[45] Mar. 17, 1981

[54] SEALING DEVICE FOR TEMPORARY PRESSURE SEALING

[75] Inventors: Ake Berglund; Ake Fries, both of Vesteras, Sweden

[73] Assignee: AB Asea-Atom, Vesteras, Sweden

[21] Appl. No.: 61,740

[22] Filed: Jul. 30, 1979

[30] Foreign Application Priority Data

Aug. 14, 1978 [SE] Sweden .................................. 7808599

[51] Int. Cl.³ ............................................. F16J 15/16
[52] U.S. Cl. ........................................ 277/27; 277/73; 277/138
[58] Field of Search .................. 277/27, 71, 72, 3, 73; 251/61.1

[56] References Cited

U.S. PATENT DOCUMENTS

| | | | |
|---|---|---|---|
| 2,529,744 | 11/1950 | Schwfitzer | 277/73 |
| 2,642,942 | 6/1953 | Reynolds | 277/73 |
| 2,705,608 | 4/1955 | Phillips | 251/61.1 |
| 3,465,786 | 9/1969 | Spisak | 251/61.1 |
| 4,103,903 | 8/1978 | Carriotti et al. | 277/27 |
| 4,204,689 | 5/1980 | Johanasson | 277/27 |

Primary Examiner—Robert I. Smith
Attorney, Agent, or Firm—Pollock, Vande Sande & Priddy

[57] ABSTRACT

A pressure seal for a rotating shaft (3) is disclosed in which a rubber sealing ring (9) is arranged in a trapezoidal slot (4), the sealing ring being made so thin at the slot opening as to prevent the rubber from creeping beyond the edges of the slot opening during prolonged periods when pressure is applied to engage the sealing ring with the shaft.

2 Claims, 4 Drawing Figures

SEALING DEVICE FOR TEMPORARY PRESSURE SEALING

TECHNICAL FIELD

The present invention relates to a sealing device for temporary pressure sealing between a shaft and a bushing surrounding the shaft, of the type in which an annular seal ring is moved by applied fluid pressure into sealing contact with the shaft;

BACKGROUND ART

Such a sealing device of a known type is shown in FIGS. 1 and 2 on the accompanying drawing, in which FIG. 1 shows a section through the center line of the device; and FIG. 2 shows an enlarged view of a portion of FIG. 1.

In FIGS. 1 and 2, an inner sleeve 1 and an outer sleeve 2. are made of metal and together form a bushing or support for a pump shaft 3. They define an annular slot 4, the opening of which faces the shaft 3. The slots walls comprise two conical annular surfaces 5 and 6, which converge in a radially inward direction so that slot 4 is trapezoidal in cross-section. A sealing ring 7 of rubber or a similar resilient, elastomeric material is arranged in the radially inner part of the slot 4. Radially outside the sealing ring, the slot 4 is connected to a channel 8 for the supply of a pressure medium, for example oil. The rubber ring 7 is formed with ring surfaces which are pressed against the conical ring surfaces 5 and 6 of the slot when channel 8 is connected to a pressure source. At the same time the radially inner surface of the rubber ring is pressed against the pump shaft 3 and seals thereagainst. Thereafter, the space above or below the rubber ring can be evacuated. When the pump is to be started, the rubber ring 7 is first relieved of pressure to avoiding abrasion thereof.

The drawback of this prior art seal is that during long periods of pressurization the rubber ring will creep in such a manner that part of the rubber material, initially disposed within the edges of the slot, will successively pass beyond these edges and accumulate outside the slot, as suggested in FIG. 2. Then when the pump is to be started and the contact between the rubber ring and the pump shaft is to be broken, this may not be possible because of the above-mentioned creep of the rubber. When the shaft 3 rotates, the rubber ring is destroyed.

DISCLOSURE OF THE INVENTION

The above-mentioned drawback is avoided in a sealing device according to the invention, in which the radially inner portion of the seal ring remains always spaced from the walls of the slot so that creep of the seal ring material does not occur which would prevent retraction of the seal ring upon depressurization.

BRIEF DESCRIPTION OF THE DRAWINGS

The invention will be described with reference to FIGS. 3 and 4 on the accompanying drawing, in which.

BEST MODE FOR CARRYING OUT THE INVENTION

Figure 1:
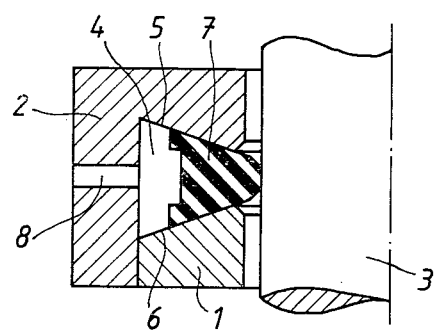
Figure 2:
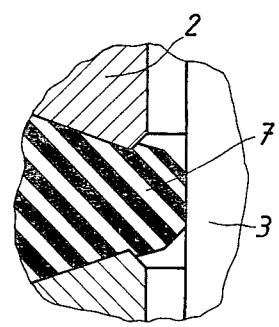
Figure 3:
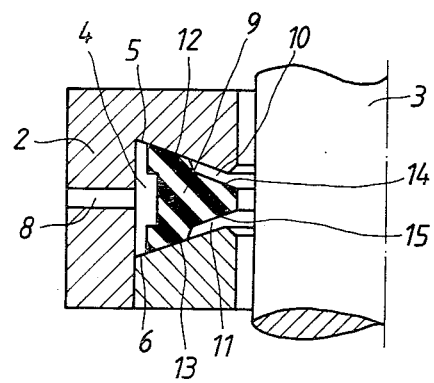
FIG. 3 shows a device according to the invention with the rubber ring in pressure-relieved state.
Figure 4:
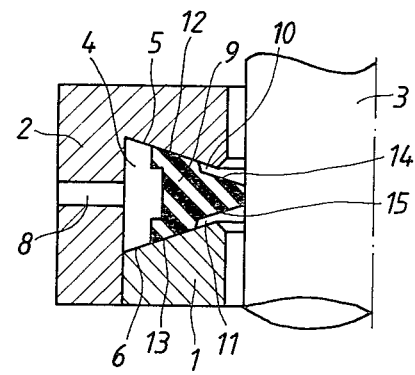
FIG. 4 shows the same device with pressurized rubber ring.

In the device according to FIGS. 3 and 4, a sealing ring 9 of rubber or a similar material is used. The other components of the device are identical with the corresponding components shown in FIGS. 1 and 2 and are designated with the same reference numerals. Sealing ring 9 has a radially outer portion which is provided with two conical, annular sealing surfaces 12 and 13, which make contact with the conical ring surfaces 5 and 6, respectively, of the slot 4. Further, the sealing ring has an approximately equally long radially inner portion which does not make contact with the slot walls and which is defined by two surfaces 14, 15 facing separate slot surface 5 and 6 and together with these defining separate annular gaps 10 and 11, respectively. Gaps 10 and 11 lie radially outside the narrowest portion of the slot also when the sealing ring 9 is fully pressurized by source 16. Thus there is no risk that an annular portion of the sealing ring lying radially inside the narrowest slot portion shall be able to creep through the narrowest slot portion to prevent the expansion of the sealing ring when the pressurization ceases.

INDUSTRIAL APPLICABILITY

The invention may be used in any application where it is desired to provide a temporary, pressure activated seal around a shaft, the seal being adapted to remain in place when not pressurized and to withdraw to a position substantially out of contact with the shaft.

Having described our invention in sufficient detail to enable those skilled in the art to make and use it, we claim:

1. An improved sealing apparatus for use between a rotatable shaft and a support surrounding said shaft, said apparatus comprising:

an annular slot formed in said support, said slot having an opening at its radially inner edge, said opening facing said shaft; said slot also having annular slot surfaces facing each other and extending to said opening;

an elastomeric sealing ring disposed in said slot, said ring having two radially outwardly located sealing surfaces for sealing against said annular slot surfaces when said ring is forced radially inwardly in said annular slot, through said opening and into contact with said shaft; said ring also having two radially inwardly located surfaces facing said annular slot surfaces, each of said further surfaces being spaced from said annular slot surfaces and said opening when said sealing surfaces seal against said annular slot surfaces as said ring extends through said opening and contacts said shaft, whereby creep of said ring past the edges of said slot is prevented so that said ring can withdraw into said slot upon release of said ring; and means for forcing said ring radially inwardly wihin said annular slot and into contact with said shaft.

2. Apparatus according to claim 1, wherein said annular slot surfaces and said sealing surfaces converge radially inwardly.

* * * * *